Figure 17:
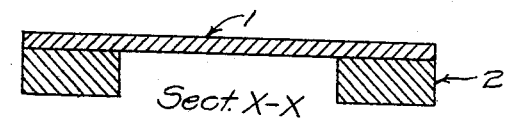

F. W. SKINNER.
SHEET PILING AND MEANS FOR DRIVING OR SINKING THE SAME.
APPLICATION FILED MAR. 6, 1907.
912,496.
Patented Feb. 16, 1909.
5 SHEETS—SHEET 1.
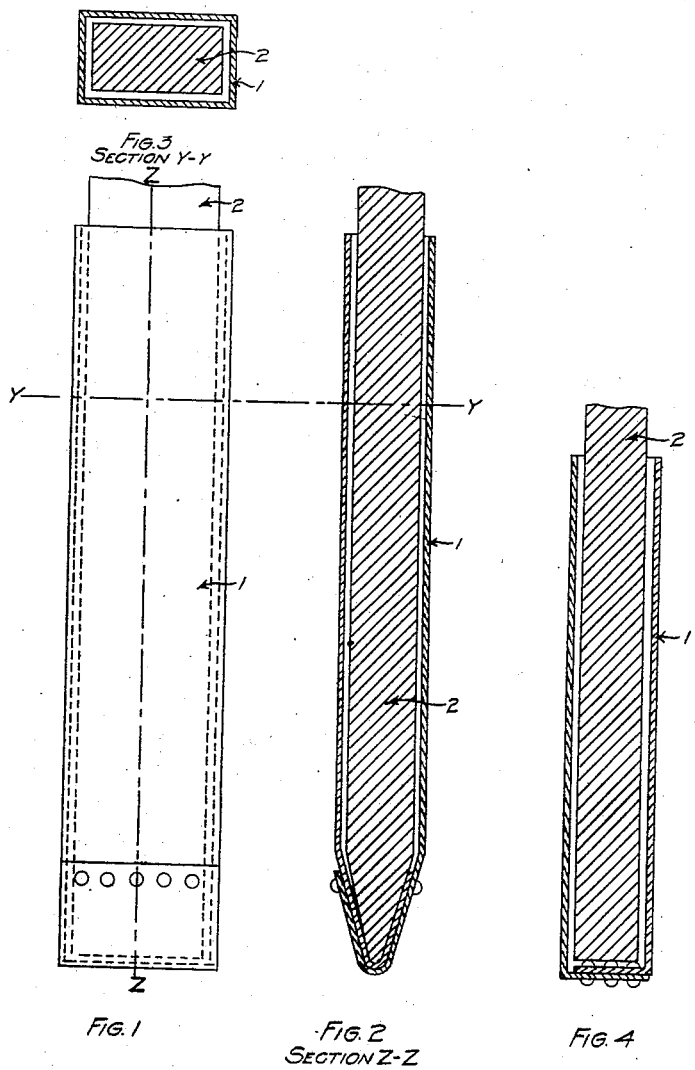

F. W. SKINNER.
SHEET PILING AND MEANS FOR DRIVING OR SINKING THE SAME.
APPLICATION FILED MAR. 6, 1907.
912,496.
Patented Feb. 16, 1909.
5 SHEETS—SHEET 2.
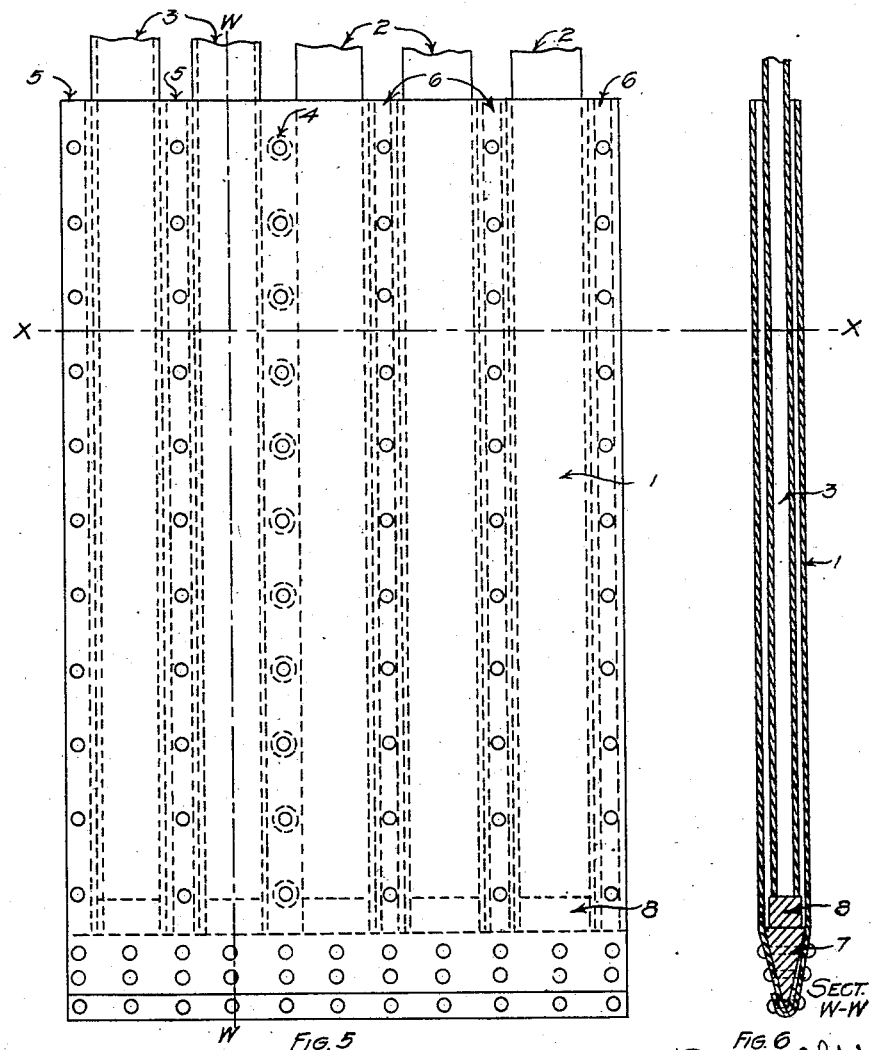

F. W. SKINNER.
SHEET PILING AND MEANS FOR DRIVING OR SINKING THE SAME.
APPLICATION FILED MAR. 6, 1907.
912,496.
Patented Feb. 16, 1909.
5 SHEETS—SHEET 3.
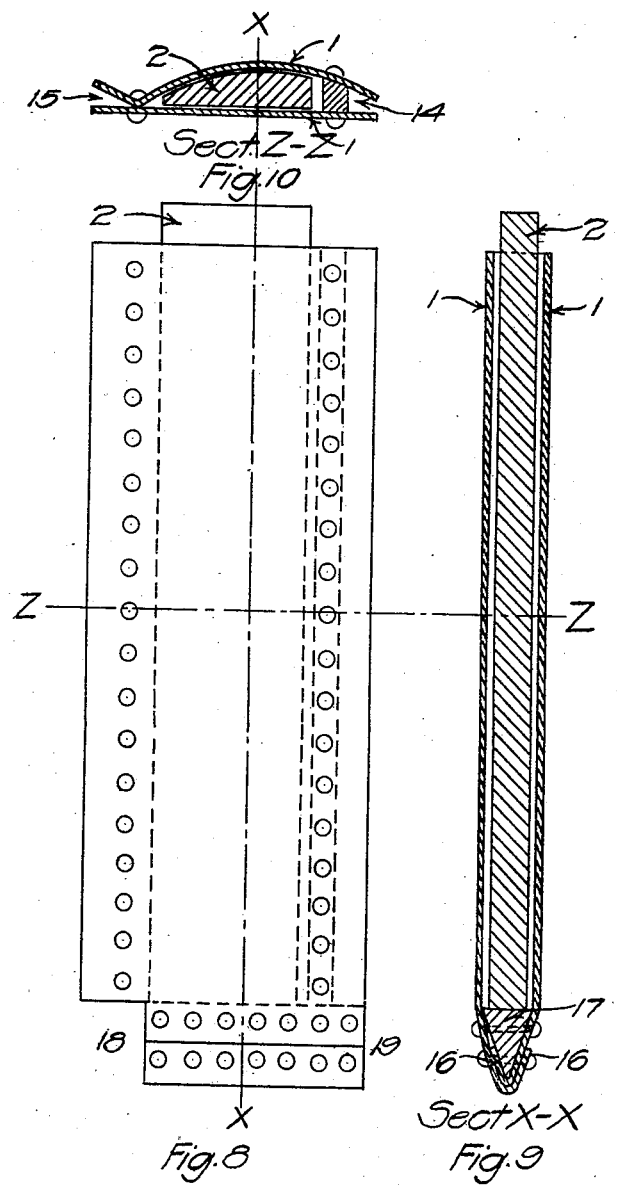

F. W. SKINNER.
SHEET PILING AND MEANS FOR DRIVING OR SINKING THE SAME.
APPLICATION FILED MAR. 6, 1907.
912,496.
Patented Feb. 16, 1909.
5 SHEETS—SHEET 4.
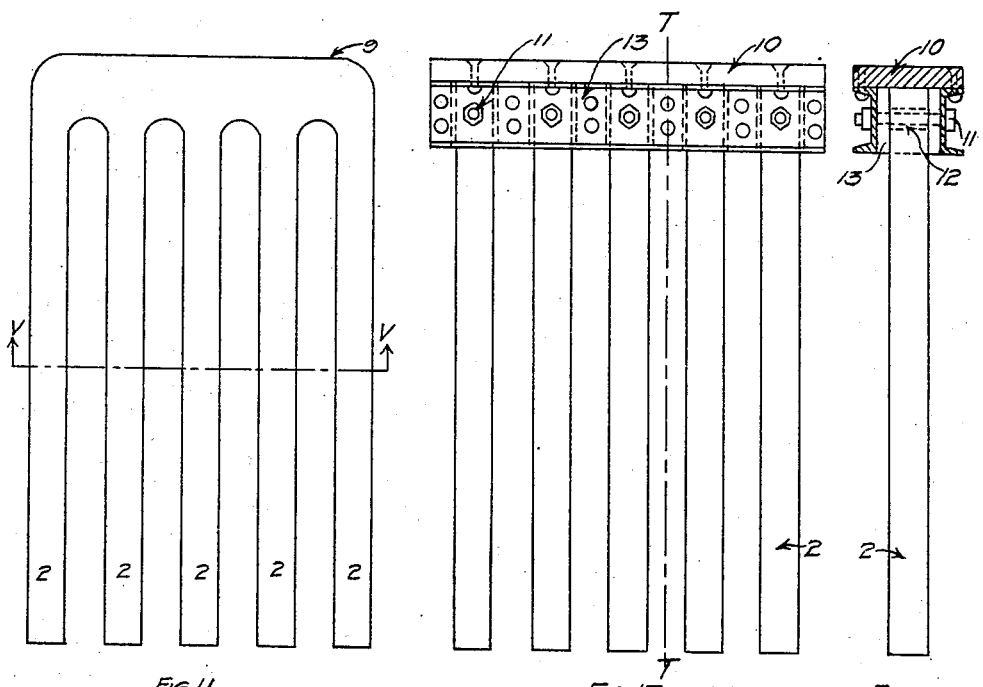
Fig.11      Fig.13      Fig.14
                         SECT. T-T
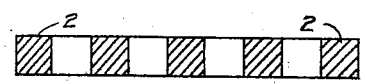
Fig.12 SECTION V-V
Witnesses
Chas. W. Bucknall.
Max Weiss
Frank W. Skinner
Inventor F. W. SKINNER.
SHEET PILING AND MEANS FOR DRIVING OR SINKING THE SAME.
APPLICATION FILED MAR. 6, 1907.

912,496.

Patented Feb. 16, 1909.
5 SHEETS—SHEET 5.

Sect. X-X

Sect. Z-Z

Witnesses:
Chas. W. Bucknall
Mat Weiss

Frank W. Skinner
Inventor

UNITED STATES PATENT OFFICE.

FRANK W. SKINNER, OF TOMPKINSVILLE, NEW YORK.

SHEET-PILING AND MEANS FOR DRIVING OR SINKING THE SAME.

No. 912,496.          Specification of Letters Patent.          Patented Feb. 16, 1909.

Application filed March 6, 1907. Serial No. 360,954.

*To all whom it may concern:*

Be it known that I, FRANK W. SKINNER, a citizen of the United States, residing at No. 50 Sherman avenue, Tompkinsville, in the county of Richmond and State of New York, have invented a new and useful Sheet-Piling and Means for Driving or Sinking the Same, of which the following is a specification.

My invention relates to the construction of piles, pile shoes and driving bars of a new and improved form to enable the piles to be driven from the lower end instead of the upper end.

All piles for bearing as well as for sheeting so far as I am aware have hitherto been driven by impact at the upper end or by hydraulic jetting or by screwing or by a combination of these methods. My invention is applicable to solid and hollow piles, to bearing and sheet piles, and to independent piles, connected piles, and interlocked piles. It provides for all of them a method of driving by impact applied only at the lower end of the pile through a driving bar and shoe.

If the metal in the body of the pile be made thin it may have strength sufficient for its ultimate service but not be strong or massive enough to resist the stresses of ordinary driving and may be so weak that it will not endure the impact of direct blows of the hammer and may cripple or be destroyed by ordinary driving. In metal piles the thickness and consequently the weight is an important factor of the cost, and I effect a great economy by making them of very thin material and of dimensions which would not, in some cases, endure driving by impact on the upper end which develops compressive stress in all parts of the pile and makes it act as a long column under severe loading. In order to avoid destruction or injury from such stresses I eliminate them by providing a strong shoe permanently attached to the foot of the pile, and engage with it a temporary driving bar or bars, amply strong to receive the full impact of the hammer and deliver to the pile blows powerful enough to drive it through the earth or othe rmaterials encountered without injury to the pile. By this means I eliminate in the pile all buckling, battering, and compression due to driving and produce in it only tension stresses due to the transmission of the blows and to the friction against the outer surface of the pile. The blows are delivered at the point of penetration and thus secure the greatest possible effectiveness with the least distress to the pile.

I am aware that thin sheet piles are reinforced and protected by temporary bars secured to them by bolts or clamps at the top and by clamps or detachable shoes at the bottom, and I do not claim these features. The previous methods do not however provide for the engagement of the driving bars with permanent fixed shoes integral with the pile, or for the protection of the upper part of the pile from impact and the delivery of the impact wholly to the lower end of the pile which are new inventions here claimed.

I am also aware that conical molds used for the construction of concrete solid bearing piles are driven by conical, collapsible interior mandrels of complicated mechanism composed of many parts. These mandrels engage the whole inner conical surface, develop a heavy pressure against it, and during the driving are essentially integral with the molds, engaging them with frictional adhesion, and transmitting little or none of the force of the impact through the lower end of the molds. I do not claim any of these features, but my invention is of a rigid, non-collapsible interior bar independent of the hollow pile and engaging a heavy shoe integral with the permanent pile and driving the latter wholly by tension transmitted through the shoe to the body of the pile and without any transmission of driving force between the surfaces of the driving bar and the pile except at the point of bearing of the driving bar on the shoe. Concrete pile molds are driven without shoes or without detachable shoes, but in my invention strong permanent shoes integral with the pile are an essential feature.

In my invention, no matter how weak or even flexible the body of the pile is, it can be driven with a hammer by means of a shoe or cutting edge integral with its lower end or point and so connected with the body of the pile as to develop a large amount of the tensional strength of the latter. The shoe is designed to serve as a pilot and pull the pile down after it as thread follows a needle, thus reversing the ordinary method of pushing the pile down from the upper end. The upper part of the shoe provides bearing for the lower end of one or more driving bars which project above the upper end of the pile and are separate and easily detachable. The driving bar engages the shoe directly or through a cushion, and receives on its upper end hammer blows heavy enough to drive the pile through very refractory material and transmits the force to the shoe or cutting edge without producing any stress except tension in the pile above the shoe.

For solid sheet piles single or multiple driving bars may be used on one or several faces and they may be of large dimensions or they may have small cross sections so as to be pulled with minimum frictional resistance. Hollow sheet piles or hollow bearing piles may be driven with a single interior driving bar or with a plurality of interior driving bars. If the piles are comparatively wide and thin it may be necessary to construct them with a plurality of interior transverse walls, partitions or fillers, dividing them into a plurality of longitudinal chambers, into several of which driving bars may be simultaneously inserted. The driving bars may be either solid or hollow and may receive the impact of the hammer directly or through a driving cap. The driving bars may be integral with the cap or separate from it.

The essential elements of my invention are the pile unit, a strong shoe integral with it, and designed to develop the tensile strength of the pile, and a rigid, detachable, driving bar. The shoe may be formed partly or wholly of the body of the pile, or may be riveted or otherwise secured to the sides of the pile so as to be essentially integral with it.

Figure 15:
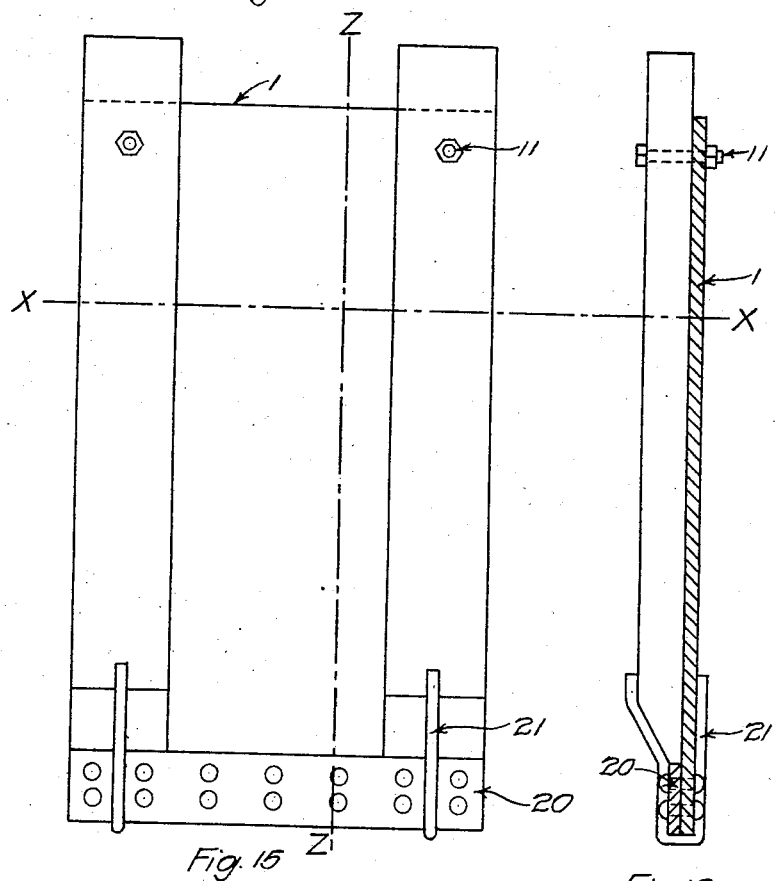
Figure 16:
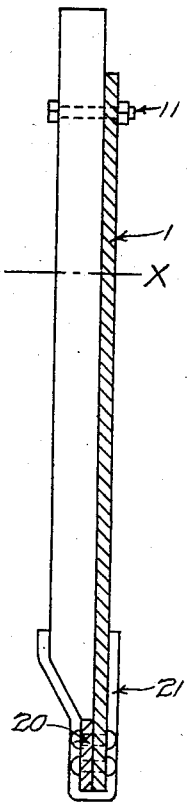
Figure 18:
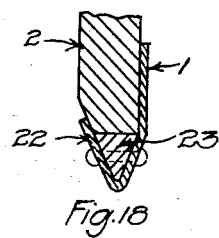

Figure 1 is a side elevation, Fig. 2 is a longitudinal section and Fig. 3 is a transverse section of a hollow pile with a single interior driving bar and has a shoe or point made by the converging and overlapping side walls. Fig. 4 is a longitudinal section through the point of a hollow pile with a shoe formed by overlapping rectangular extensions of the side walls. Fig. 5 side elevation, Fig. 6 is a longitudinal section and Fig. 7 is a transverse section of a wide, thin, pile having thin side plates connected by separators. It has a solid interior shoe or point riveted between the side plates and has a plurality of driving bars inserted in the spaces between the separators. Fig. 8 is a side elevation, Fig. 9 is a longitudinal section, and Fig. 10 is a transverse section of a hollow sheet pile with interlocking edges and a single interior driving bar. Fig. 11 is a side elevation, and Fig. 12 is a transverse section of a plurality of driving bars made integral with a driving cap. Fig. 13 is a side elevation, and Fig. 14 is a vertical transverse section of a driving cap separable from the driving bars. Fig. 15 is a side elevation, Fig. 16 is a longitudinal section, and Fig. 17 is a transverse section of a sheet pile with a plurality of driving bars engaging its shoe. Fig. 18 is a longitudinal section through the lower end of a sheet pile similar to that shown in Figs. 15, 16, and 17, but having a different shoe with a bearing piece riveted between the bent sides of the web plate of the pile.

Similar figures designate the same, or corresponding parts in the different views.

In Figs. 1 and 2 the shoe is formed by the overlapping bent ends of the side plates, 1, 1, riveted together and receiving the driving bar, 2, so as to develop a large percentage of the tensile strength of the pile to resist the impact of the hammer on the top of the driving bar.

In Figs. 5, 6, and 7, the thin wide side plates are riveted together through solid vertical fillers, 5, 5, or hollow vertical fillers, 6, 6, or small separators, 4, 4. The lower ends of the side plates, 1, 1, are bent more than 90 degrees around the point to overlap and rivet together through the solid shoe, 7, and a cushion, 8, is inserted between the shoe and the hollow driving bar, 3, or the solid driving bar, 2.

In Figs. 8, 9, and 10, the side plates, 1, 1, of the hollow sheet pile are extended to form the interlocking longitudinal joints, 14, and 15, and at the lower end are bent around and riveted to the shoe piece, 17, which has a notch, 18, at one end to clear the solid corner, 19, at the opposite end, where it is extended to close the bottom of the joint, 14, on the forward edge of the pile. In Figs. 11, and 12, the driving cap, 9, is integral with the plurality of driving bars, 2, 2, 2, etc.

In Figs. 13, and 14, the detachable driving cap, 10, is made with separators, 13, 13, 13, the spaces between which form pockets to receive the tops of the driving bars, 2, 2, 2, 2, which are held in place by bolts 13, 13, 13, with clearance sufficient to compensate for irregularities of dimensions.

In Figs. 15, 16, and 17, the driving bars, 2, 2, engage the shoe, 20, riveted to the lower edge of the sheet pile web, 1, and are detachably secured at the upper end by bolts, 11, 11, and at the lower end by clamps, 21, 21, which, when the driving bars are withdrawn, remain in the ground.

In Fig. 18, the shoe is concentric and symmetrical with the combined sheet pile and driving bar, and the bent edge, 22, forms a guard to secure the end of the driving bar, 2, in engagement with the shoe 23, during driving, and releases it for withdrawal.

It is obvious that the piles here shown may be made with various forms of cross sections, with or without interlocking edges, and with straight or curved plates. That the driving bars may be used inside or outside, with or without driving caps, and with or without cushions on the shoes. That many other forms of driving bars and shoes may be devised to transmit the effect of the hammer to the lower end of the pile, and that the details here shown may be combined and modified in various ways. The illustrations here given show simple forms of construction, intended to illustrate the fundamental principles involved and describe practical construction, but I do not limit myself to the exact details here shown.

I claim,

1. A sheet pile divided into a plurality of longitudinal spaces or cells by fillers riveted between opposite web plates.

2. The combination of a shoe and a hollow pile made with the side plates bent more than 90 degrees around the point.

3. A hollow pile shoe with the side plates of the pile bent to overlap it on opposite sides.

4. The combination of a pile and a plurality of driving bars adapted to transmit the hammer impact to the pile shoe.

5. The combination of a pile, a driving bar and a cushion between the pile shoe and the driving bar.

6. The combination of a pile, a driving bar, a driving cap, and a cushion between the driving bar and the pile shoe.

7. The combination of a pile, a plurality of driving bars adapted to transmit the hammer impact to the pile shoe, and a cap distributing the hammer impact on the driving bars.

8. A pile with the sides bent at the point to engage a shoe.

9. A pile shoe made with an inside piece engaged between and inclosed on opposite sides by the sides of the pile.

10. A hollow sheet pile with a plurality of interior cells formed by the outside web plates and a plurality of fillers riveted between them.

11. A hollow sheet pile unit made with web plates separated by fillers and provided, on their edges, with interlocking devices.

12. The combination of a driving cap and a plurality of driving bars.

13. The combination of an interior driving bar and a hollow sheet pile unit with interlocking edges.

Signed, March 4, 1907.

FRANK W. SKINNER.

Witnesses:
 CHAS. W. BUCKNALL,
 MAX WEISS.